Aug. 21, 1945.  M. SILGE  2,383,347
REFRACTOMETER
Filed Sept. 21, 1942
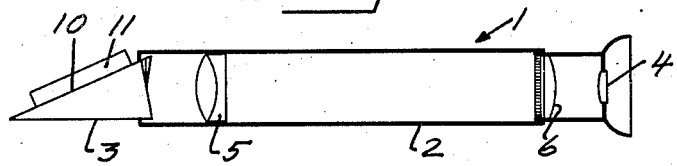
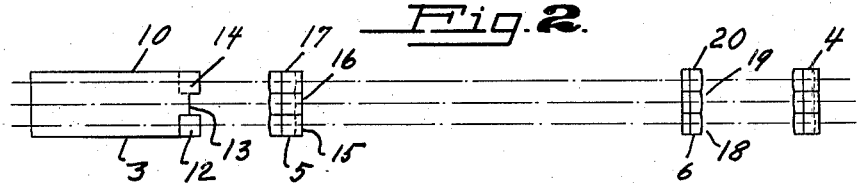
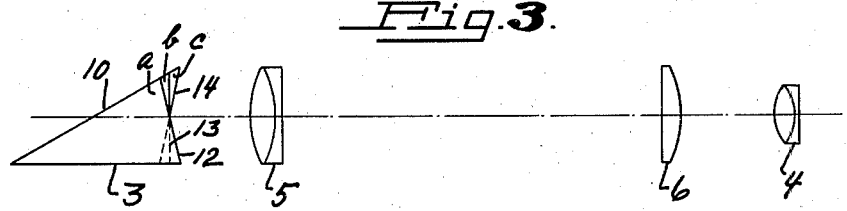
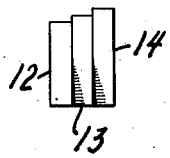 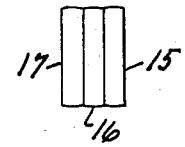  
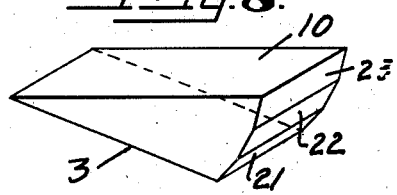 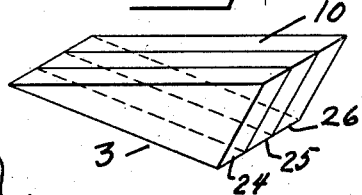
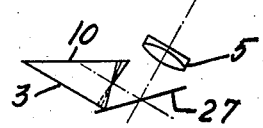
INVENTOR.
MARTIN SILGE.
BY
A. Schapp
ATTORNEY.

Patented Aug. 21, 1945

2,383,347

UNITED STATES PATENT OFFICE 2,383,347

REFRACTOMETER

Martin Silge, Oakland, Calif.

Application September 21, 1942, Serial No. 459,139

3 Claims. (Cl. 88—14)

The present invention relates to improvements in refractometers, and has particular reference to refractometers used in measuring the light refracting power of samples such as liquids, semi-solids and solids to establish certain physical properties of such samples. Refractometers of this type are based on the principle of total reflection and may be divided into two groups:

a. Refractometers with index prism and telescope arranged so that one unit may be moved mechanically with respect to the other. The borderline of total reflection is observed through the telescope and is brought into coincidence with a suitable target in the telescope. The angular displacement observed between the index prism and the telescope then is translated into refractive indices or corresponding values such as percentages of soluble solids present. This group comprises such refractometers as the Abbe, Pulfrich, Crystal, and similar popular types.

b. Refractometers with index prism and telescope forming a rigid unit with regard to each other. A scale in the ocular of the telescope serves to read directly the position of the borderline of total reflection of the sample. This group comprises refractometers of the dipping (immersion)—and various so-called hand-refractometer types.

The relative merits of the two types of refractometers are clearly marked. Refractometers of the (a) group have a relatively wide measuring range, covering such range as $nD=1.3$ to $nD=1.7$ or more. Their measuring accuracy, however, is necessarily limited because of the inherent deficiencies associated with such mechanical components as moving levers, bearings, spindles, racks and pinions, etc.; and such parts form construction elements of importance in these refractometers. In most of the instruments of this type the manufacturers, therefore, limit the reading accuracy to within a few units of the fourth decimal of the refractive index $nD$. Mechanical wear and tear has necessarily a direct effect on the accuracy and dependability of these instruments.

Refractometers of the (b) group do not require moving mechanical parts for the purpose of determining the position of the borderline of total reflection because the image of the latter is cast directly onto the scale inside of the telescope tube where it is read through the ocular. The position of this image is entirely a function of the refractive index of the sample being measured and the optical properties of the index prism and the telescope of the refractometer. The reading accuracy is largely controlled by the telescope magnification. The higher the latter, the greater the relative displacement of the image of the borderline of total reflection for two neighboring refractive indices, which in turn permits higher reading accuracy against scale divisions. Dipping (immersion) refractometers, utilizing this principle are built to read the refractive index $nD$ reliably to within a few units of the fifth decimal and are considered the most accurate of commercial refractometers. This accuracy could, no doubt, be increased further by the use of still higher telescope magnifications.

However, since, everything else being equal, the field of view of a telescope is approximately inversely proportional to its magnification, the measuring range of refractometers in this group is limited, and in no case can it be greater than the range of refractive indices embraced by the scale in the ocular.

In order to increase the total range of such refractometers, a whole series of interchangeable index prisms, made of glass of different refractive indices and of differing refractive angles, have been provided. Each change of prism, however, requires a re-calibration of the instrument, is awkward and may cause damage. This method, therefore, has not become popular, and its use is confined to research laboratories. Little use is made of it in production control, as it seems to preclude the use of unskilled technicians.

In certain so-called hand-refractometers based on the principle of the (b) group, a comparatively low telescope magnification is employed and no provision is made for the interchangeability of the index prism. But, in spite of the lower telescope magnification, the measuring range of these hand-refractometers is not sufficient to cover all requirements of the various users, and it has been found necessary, therefore, to develop a number of such instruments, each covering a different range.

In the present invention it is proposed to provide a refractometer which combines the advantages of refractometers of the (a) and (b) groups, while avoiding the disadvantages of either.

More particularly it is proposed to combine an index prism having refracting characteristics commanding consecutive, possibly overlapping ranges of refractive power with a telescope containing a series of fixed scales of consecutive ranges cooperable with the different ranges covered by said index prism. It is the purpose of these scales to indicate the refractive index or other desired properties, such as percentage of sugar content, of the objects under observation on the particular scale corresponding to the portion of the index prism commanding the range within which the object under observation happens to fall.

It is further proposed to provide in the same telescope, a corresponding series of objectives, each objective cooperating with the respective prism section and the corresponding scale to form an image of the borderline of total reflection on the latter.

My refractometer thus covers a wide range of refractive indices, but still forms a single fixed unit requiring no movable parts for the purpose of finding the relative positions of the borderline of total reflection.

Further objects and advantages of my invention will appear as the specification proceeds and the novel features of the invention will be fully set forth in the claims hereto attached.

The preferred form of my invention is illustrated in the accompanying drawing, forming part of this application, in which:

Figure 1 shows schematically a longitudinal section through my refractometer;

Figure 2, an enlarged schematic view, in plan, of the optical parts of my device;

Figure 3, a similar view showing the optical parts in elevation;

Figure 4, a rear elevation of the prism shown in Figures 1, 2 and 3;

Figures 5, 6 and 7, front elevations, respectively of a multi-objective, a multi-scale lens and a multi-eye lens used in my device;

Figure 8, a perspective view of a modified form of prism adapted for use in my refractometer;

Figure 9, a perspective view of a still further modified form of prism; and

Figure 10, a schematic arrangement of parts in which the telescope is mounted at an angle with respect to the prism.

While I have shown only the preferred forms of my invention, I wish to have it understood that various changes or modifications may be made within the scope of the claims hereto attached, without departing from the spirit of the invention.

Referring to the drawing in detail, my refractometer 1 comprises a telescope 2 having a prism 3 at its outer end, an ocular with a multi-eye lens 4 and a multi-scale lens 6 at its inner end, and a multi-objective 5 interposed between the prism and the ocular at proper distances.

The prism 3 is shown in different views in Figures 1 to 4, respectively, and comprises a unitary prism structure consisting of three adjacent sections. The sections have a common entrance face 10 on which the sample under observation is disposed, as at 11. The rear or exit faces 12, 13 and 14 of the three sections differ and form different refracting angles with the entrance faces.

When a ray forming the borderline of total reflection, enters the prism at the entrance face, it is refracted, and as it leaves through the rear face, it is again refracted, the total refraction depending upon the refractive index of the sample under observation, the refractive index of the prism and the refracting angle. Since the angles $a$, $b$, and $c$ vary in the three sections of the prism, it is apparent that each section will emit its range of rays at an angle different from that of the other sections. The angles are arranged so that the different prism sections command consecutive and partly overlapping ranges.

The refracted rays pass to the objective 5 which serves the purpose of forming an image of the borderline of total reflection on the scale 6, where its position in scale divisions may be read. The objective is divided into a number of parallel sections 15, 16 and 17, corresponding to the sections of the prism, each section of the objective cooperating with a section of the prism. It is desirable, of course, to have the sections of the objective mounted in a single unit and in the same plane.

The scale lens 6 is similarly divided into three sections, 18, 19 and 20, and these sections are made to cooperate individually with the three sections of the objective and the three sections of the prism in such a manner that each scale section receives an image of the borderline of total reflection from its respective prism section only through a limited portion of the total range of said prism.

Assuming, for instance, that for the device as a whole, a total range of $nD$ 1.3 to 1.55 is desired, which is slightly more than the total range required for establishing the sugar content of a liquid, the refractive index of pure water being approximately $nD$ 1.33, and that of pure sugar being approximately $nD$ 1.55: If the central prism section 13 alone were used, as in the conventional refractometer, the total range of rays forming the borderline of total reflection emanating from the rear face might spread fan-wise, in a given example, over an angle of 30 degrees, the exact position of the borderline within that angle depending on the refractive index of the sample under observation. This total range would be impractical to utilize in connection with a single scale, due to inherent limitations in the dimensions of the telescope and its field of view at magnifications required for accurate readings. It is proposed, therefore, in the present invention, to split the total range into a number of parts, three being selected for the purposes of example only, and to confine the central scale section to cooperative reading with a limited portion of the entire range of the central prism section, preferably, of course, the central portion.

Thus, I would divide the total range of 30 degrees of the central prism 13 into three parts, each comprising ten degrees only. The central scale section 19, in Figure 6, would be arranged and calibrated to receive the image of the borderline of total reflection only if the refractive index of the sample under observation falls within the central range. We have assumed that the total range of the refractometer is to cover refractive indices of the samples between $nD$ 1.3 and 1.55, which might be conveniently subdivided into three sub-ranges equivalent to those refractive indices that happen to fall within the three consecutive angles of ten degrees each. In the example under discussion, the central scale section would show the typical borderline of total reflection only if the sample falls within the middle range of 10 to 20 degrees, while for the two outer ranges, the central scale would show either light or dark, depending upon whether the index of the sample is higher or lower than the central range.

The two outer sections 18 and 20 of the scale are intended for cooperation with the two outer prism sections. While the two outer scale sections might be placed in any suitable position, provided the other cooperating optical components are lined up correspondingly, for convenience of operation, it is desirable that they be placed alongside of the central section within a rather limited field, as illustrated in Figure 6. To allow of such positioning, it is necessary that the two outer prism sections 12 and 14 be arranged so that the centerline of the range of rays issuing from each strikes its cooperative scale section at the center thereof.

We assumed that the total range of rays emanating from the central section of the prism extended over an angle of 30 degrees corresponding to a total range of refractive indices from $nD$ 1.3 to 1.55. The central scale section takes care of the central ten degrees covering the equivalent range of refractive indices. This leaves the two outer ten degree sections of the total angle to cover the refractive indices corresponding to the angles embraced by those sections to be taken care of by the two outer prism sections and the corresponding two outer scale sections. While the central prism section is designed to project the centerline of its total range upon the center of the central scale section, the two outer prism sections are designed to project the respective centerlines of the two outer ten degree positions of the total range of emerging rays upon the respective centers of the two outer scale sections, each of the outer scale sections being limited to a range of 10 degrees, that is 5 degrees on opposite sides of each centerline.

In this manner the first section 12 of the prism cooperates with the first scale section 18 in indicating the image of the borderline of total reflection, where the refractive index of the sample falls within the first 10 degrees of the total range of 30 degrees, while the second prism section cooperates with the second scale section where the refractive index falls within the second 10 degrees of the total range of 30 degrees; and the third prism section cooperates with the third scale section to take care of the third 10 degrees of the total range of 30 degrees and their corresponding refractive indices.

Thus, when the refractive index of the sample happens to be such as to cause the borderline of total reflection to appear in the center of the second scale section, the first scale section and the bottom of the second section will appear dark, while the upper portion of the second section and the third section remain light.

The exact shape of the three prism sections and their refractive angles can be found by calculation. I find, for instance, under a given set of circumstances, that if the refractive angle $b$ of the central prism section is assumed to be 61°, the corresponding refractive angles $a$ and $c$ of the two outer sections should be approximately 72° and 50°, respectively, when using glass of a refractive index of $nD=1.65$. The exact angle, of course, depends also upon the distance between the prism and the scale lens, that is, the optical properties of the telescope.

Similar results may be obtained by arranging the prism as illustrated in Figure 8, in which the three sections 21, 22 and 23 are positioned in vertical order instead of side by side relation. In this case the three ranges of emerging rays would spread fan-wise and the corresponding scale sections might be arranged in similar order to catch portions of the rays emerging from each prism section, or suitable refracting or reflecting means might be provided for converging the different ranges of rays to allow of side by side arrangement of the scale sections in a concentrated area.

Another possible modification of prism is illustrated in Figure 9, in which the three prism sections 24, 25 and 26 have the same refracting angle, but are made of material of different refractive indices in the three sections to produce the desired result. It is also possible, of course, to combine variations in refracting angles with variation in refractive indices in the three sections for the same purpose.

The same principle may be employed where it is desired, for convenience of observation, to arrange the telescope at an angle to the prism, as in Figure 10, where a suitable reflector 27 is used to divert the rays in the proper direction.

The index prism may be made of one piece of glass, or be composed of a plurality of pieces, either cemented together or separated from each other, and glass of the same or different refractive indices for each of the units may be used. In the latter case, the refractive angles could be alike or could differ from each other—all of which would depend on the specific tasks the refractometer has to perform.

It is the purpose of the new design to divide the total measuring range of the index prism in as many consecutive portions as will be necessary in order to cover each of them by a separate ocular scale. Since the length of such a scale is limited to the field of vision of the telescope in conjunction with which it is to be used, and since this field of view is largely determined by the magnification of the telescope, it follows that the latter, to a large extent, will also determine the number of scales required in order to distribute over them the total measuring range of the refractometer.

The number of scales obviously will determine the construction of the index prism, the number and arrangement of rear surface sections, the appertaining refractive angles and the type of glass or glasses from which it is to be made.

While, for example, the demands upon the reading accuracy made on a hand-refractometer, are moderate, and a low telescope magnification with a large field of view would be sufficient, the demands in the case of a research refractometer would be much more exacting, meaning that a high telescope magnification would have to be used in order to attain the desired accuracy. While in the former case, two or three scales would suffice, more would be required in the latter case.

I claim:

1. A refractometer comprising a rigid housing, a series of spaced scales of consecutive values mounted in a limited field in said housing, a refracting means rigidly mounted in the housing in operative relation to the scales for refracting rays passing through samples under observation in accordance with the refractive indices of the samples, the refracting means comprising a plurality of fixed sections of different refractive powers for splitting the total range of refracted rays passing therethrough into a series of sub-ranges of consecutive sample index values corresponding to the scale values and for directing the sub-ranges toward the corresponding scales, and rigid means interposed between the refracting means and the scales for rendering the sub-ranges of refracted rays readable on the scales of corresponding measuring values, whereby the refractometer is made to selectively register the index value of any sample within the total range on one of the scales without requiring mechanical adjustment.

2. A refractometer comprising a rigid housing, a series of spaced scales of consecutive values mounted in a limited field in said housing, a refracting means rigidly mounted in the housing in operative relation to the scales for refracting rays passing through samples under observation in accordance with the refractive indices of the samples, the refracting means comprising a plurality of fixed sections of different refractive angles for splitting the total range of refracted rays passing therethrough into a series of sub-ranges of consecutive sample index values corresponding to the scale values, and for directing the sub-ranges toward the corresponding scales, and rigid means interposed between the refracting means and the scales for rendering the sub-ranges of refracted rays readable on the scales of corresponding measuring values, whereby the refractometer is made to selectively register the index value of any sample within the total range on one of the scales without requiring mechanical adjustment.

3. A refractometer comprising a rigid housing, a series of spaced scales of consecutive values mounted in a limited field in said housing, a refracting means rigidly mounted in the housing in operative relation to the scales for refracting rays passing through samples under observation in accordance with the refractive indices of the samples, the refracting means comprising a plurality of fixed sections of different refractive indices for splitting the total range of refracted rays passing therethrough into a series of sub-ranges of consecutive sample index values corresponding to the scale values, and for directing the sub-ranges toward the corresponding scales, and rigid means interposed between the refracting means and the scales for rendering the sub-ranges of refracted rays readable on the scales of corresponding measuring values, whereby the refractometer is made to selectively register the index value of any sample within the total range on one of the scales without requiring mechanical adjustment.

MARTIN SILGE.